US011179881B2

(12) United States Patent
Menchik et al.

(10) Patent No.: US 11,179,881 B2
(45) Date of Patent: Nov. 23, 2021

(54) CARTRIDGE ARRAY FOR A THREE-DIMENSIONAL PRINTING APPARATUS

(71) Applicant: STRATASYS LTD., Rehovot (IL)

(72) Inventors: Guy Menchik, Ra'anana (IL); Hanan Gothait, Rehovot (IL); Eliahu M. Kritchman, Tel Aviv (IL)

(73) Assignee: STRATASYS LTD., Rehovot (IL)

( * ) Notice: Subject to any disclaimer, the term of this patent is extended or adjusted under 35 U.S.C. 154(b) by 0 days.

(21) Appl. No.: 16/858,654

(22) Filed: Apr. 26, 2020

(65) Prior Publication Data

US 2020/0254693 A1 Aug. 13, 2020

Related U.S. Application Data

(63) Continuation of application No. 15/687,489, filed on Aug. 27, 2017, now Pat. No. 10,632,679, which is a
(Continued)

(51) Int. Cl.
*B29C 41/34* (2006.01)
*B29C 64/112* (2017.01)
(Continued)

(52) U.S. Cl.
CPC ............ *B29C 64/112* (2017.08); *B29C 64/20* (2017.08); *B29C 64/336* (2017.08); *B29C 64/35* (2017.08); *B29C 64/386* (2017.08); *B29C 64/393* (2017.08); *B29C 64/40* (2017.08); *B33Y 30/00* (2014.12); *B33Y 40/00* (2014.12);
(Continued)

(58) Field of Classification Search
CPC ... B29C 64/336; B29C 64/386; B29C 64/393; B41J 2/17503; B41J 2/17506; B41J 2/17509; B41J 2/17523; B41J 2/17546; B41J 2/17566; B41J 2002/17569; B41J 2002/17589; G01G 17/06
USPC ...... 425/135, 145, 148, 375; 347/5, 6, 7, 40, 347/43, 86
See application file for complete search history.

(56) References Cited

U.S. PATENT DOCUMENTS 4,575,330 A 3/1986 Hull
4,631,558 A * 12/1986 Hara ........................ B41J 2/175
347/86
(Continued)

FOREIGN PATENT DOCUMENTS

CN 1 375 399 10/2002
DE 196 42 899 A1 10/1997
(Continued)

OTHER PUBLICATIONS

"Three Dimensional Printing: What is the 3DP Process?" http://web.mit.edu/afs/athena/org/t/tdp/www.
(Continued)

*Primary Examiner* — Leo B Tentoni
(74) *Attorney, Agent, or Firm* — Pearl Cohen Zedek Latzer Baratz LLP

(57) ABSTRACT

A three-dimensional printing system to print three-dimensional objects and a method of printed are disclosed. The system includes a printing apparatus to print three-dimensional objects and a controller to receive data from a material supply source and to control said printing apparatus.

16 Claims, 5 Drawing Sheets

Related U.S. Application Data continuation of application No. 14/450,306, filed on Aug. 4, 2014, now abandoned, which is a continuation of application No. 13/204,816, filed on Aug. 8, 2011, now Pat. No. 8,798,780, which is a continuation of application No. 12/770,236, filed on Apr. 29, 2010, now Pat. No. 7,996,101, which is a continuation of application No. 10/534,615, filed as application No. PCT/IL03/00955 on Nov. 12, 2003, now Pat. No. 7,725,209.

(60) Provisional application No. 60/425,250, filed on Nov. 12, 2002.

(51) Int. Cl.

| | | |
|---|---|---|
| *B33Y 30/00* | (2015.01) | |
| *B33Y 50/02* | (2015.01) | |
| *B33Y 40/00* | (2020.01) | |
| *B41J 2/175* | (2006.01) | |
| *B29C 64/40* | (2017.01) | |
| *G01G 17/06* | (2006.01) | |
| *B29C 64/393* | (2017.01) | |
| *B29C 64/336* | (2017.01) | |
| *B29C 64/386* | (2017.01) | |
| *B29C 64/20* | (2017.01) | |
| *B29C 64/35* | (2017.01) | |

(52) U.S. Cl.
CPC .............. *B33Y 50/02* (2014.12); *B41J 2/175* (2013.01); *B41J 2/1752* (2013.01); *B41J 2/17503* (2013.01); *B41J 2/17506* (2013.01); *B41J 2/17509* (2013.01); *B41J 2/17513* (2013.01); *B41J 2/17523* (2013.01); *B41J 2/17546* (2013.01); *B41J 2/17553* (2013.01); *B41J 2/17566* (2013.01); *G01G 17/06* (2013.01); *B41J 2002/17569* (2013.01); *B41J 2002/17589* (2013.01)

(56) References Cited

U.S. PATENT DOCUMENTS

| | | |
|---|---|---|
| 5,136,515 A | 8/1992 | Helinski |
| 5,204,055 A | 4/1993 | Sachs et al. |
| 5,216,616 A | 6/1993 | Masters |
| 5,263,130 A | 11/1993 | Pomerantz et al. |
| 5,280,300 A | 1/1994 | Fong et al. |
| 5,287,435 A | 2/1994 | Cohen et al. |
| 5,307,129 A | 4/1994 | Miura et al. |
| 5,340,433 A | 8/1994 | Crump |
| 5,387,380 A | 2/1995 | Cima et al. |
| 5,510,066 A | 4/1996 | Fink et al. |
| 5,594,652 A | 1/1997 | Penn et al. |
| 5,598,340 A | 1/1997 | Medard et al. |
| 5,682,183 A | 10/1997 | Wade et al. |
| 5,695,707 A | 12/1997 | Almquist et al. |
| 5,695,708 A | 12/1997 | Karp et al. |
| 5,717,599 A | 2/1998 | Menhennett et al. |
| 5,731,824 A | 3/1998 | Kneezel et al. |
| 5,784,279 A | 7/1998 | Bariage, III et al. |
| 5,788,388 A | 8/1998 | Cowgar et al. |
| 5,902,537 A | 5/1999 | Almquist et al. |
| 5,943,235 A | 8/1999 | Earl et al. |
| 5,997,121 A | 12/1999 | Altfather et al. |
| 6,030,199 A | 2/2000 | Tseng |
| 6,126,884 A | 10/2000 | Kerekes et al. |
| 6,136,252 A | 10/2000 | Bedal et al. |
| 6,164,743 A | 12/2000 | Hmelar et al. |
| 6,165,406 A | 12/2000 | Jang et al. |
| 6,193,923 B1 | 2/2001 | Leyden et al. |
| 6,206,511 B1 | 3/2001 | Cook |
| 6,238,112 B1 | 5/2001 | Girones et al. |
| 6,259,962 B1 | 7/2001 | Gothait |
| 6,347,257 B1 | 2/2002 | Bedal et al. |
| 6,405,095 B1 | 6/2002 | Jang et al. |
| 6,490,496 B1 | 12/2002 | Dacey |
| 6,503,831 B2 | 1/2003 | Speakman |
| 6,508,971 B2 | 1/2003 | Leydon et al. |
| 6,532,394 B1 | 3/2003 | Earl et al. |
| 6,569,373 B2 | 5/2003 | Napadensky |
| 6,652,256 B2 * | 11/2003 | Coe .................. B33Y 30/00 425/375 X |
| 6,658,314 B1 | 12/2003 | Gothait |
| 6,850,334 B1 | 2/2005 | Gothait |
| 6,902,246 B2 | 6/2005 | Varnon et al. |
| 7,725,209 B2 | 5/2010 | Menchik et al. |
| 2001/0020971 A1 | 9/2001 | Usui et al. |
| 2002/0011693 A1 | 1/2002 | Leyden et al. |
| 2002/0080335 A1 | 6/2002 | Silverbrook |
| 2002/0167101 A1 * | 11/2002 | Tochimoto .............. B29C 41/36 264/40.1 |
| 2002/0171177 A1 | 11/2002 | Kritchman et al. |
| 2003/0151167 A1 | 8/2003 | Kritchman |
| 2003/0207959 A1 | 11/2003 | Nadpensky et al. |
| 2005/0001356 A1 | 1/2005 | Tochimoto et al. |
| 2005/0175498 A1 | 8/2005 | Nelson et al. |

FOREIGN PATENT DOCUMENTS

| | | |
|---|---|---|
| DE | 694 23 999 T2 | 11/2000 |
| DE | 296 24 275 U1 | 7/2001 |
| DE | 696 15 323 T2 | 4/2002 |
| DE | 602 20 529 T2 | 7/2008 |
| EP | 0 470 705 | 2/1992 |
| EP | 0626267 | 11/1994 |
| EP | 0718104 A1 | 6/1996 |
| EP | 0 852 536 | 9/1996 |
| EP | 1004451 | 5/2000 |
| EP | 1053881 | 11/2000 |
| EP | 1136268 | 9/2001 |
| GB | 2059573 A | 4/1981 |
| GB | 2 223 928 | 1/1991 |
| GB | 2 321 220 | 7/1998 |
| WO | WO 94/19112 | 9/1994 |
| WO | WO 97/28955 | 8/1997 |
| WO | WO 01/53105 | 9/1997 |
| WO | WO 97/31781 | 9/1997 |
| WO | WO 01/26023 | 4/2001 |

OTHER PUBLICATIONS

Z Corporation, New Release, "Z Corp. Debuts Robust New Materials System", Apr. 2, 1998.

Solid Freeform Fabrication Proceedings—Harris L. Marcus et al. pp. 130-133 "A 3D Print Process for Inexpensive Plastic Parts" Sep. 1995 1995 The University of Texas at Austin.

* cited by examiner

CARTRIDGE ARRAY FOR A THREE-DIMENSIONAL PRINTING APPARATUS

CROSS REFERENCE TO RELATED APPLICATIONS

This application is a continuation application of U.S. patent application Ser. No. 15/687,489, filed on Aug. 27, 2017, now U.S. Pat. No. 10,632,679, which is a continuation of U.S. patent application Ser. No. 14/450,306, filed Aug. 4, 2014, now abandoned, which is a continuation application of U.S. patent application Ser. No. 13/204,816, filed Aug. 8, 2011, now U.S. Pat. No. 8,798,780. U.S. patent application Ser. No. 13/204,816 is a continuation application of U.S. patent application Ser. No. 12/770,236, filed Apr. 29, 2010, now U.S. Pat. No. 7,996,101, which in turn is a continuation application of U.S. patent application Ser. No. 10/534,615, filed Dec. 14, 2005, now U.S. Pat. No. 7,725,209, which in turn is a National phase application of PCT International Application No. PCT/IL03/00955, filed Nov. 12, 2003, which in turn claims priority from U.S. Provisional Application No. 60/425,250, filed on Nov. 12, 2002, all of which are incorporated herein by reference in their entirety.

FIELD OF THE INVENTION

The present invention relates to apparatuses and methods useful in three-dimensional object printing. Specifically, embodiments of the present invention relate to systems, methods, and apparatuses for management of the supply of modeling materials for use in three-dimensional object printing.

BACKGROUND OF THE INVENTION

Three-dimensional (3D) printing is a process used for the printing of three-dimensional objects, for example by printing or building parts of such models in layers. Such 3D models may be used, for example, for production of prototype parts and/or tools for use in the manufacturing of 3D products or models.

Various systems have been developed for computerized three-dimensional printing, wherein material for object printing is deposited in consecutive layers according to a pre-determined configuration or in selected arrays as defined by, for example, a Computer Aided Design (CAD) system connected to the printing systems. Such materials may include materials for constructing an object and materials used for constructing support structures for an object.

Some three-dimensional printers utilize a printing head, for example an ink-jet type printing head, through which material for printing three-dimensional objects is jetted. The printing head may draw material from a reservoir containing the material. The reservoir may be connected to the printing head, and may supply the material via a tube or tubes to the printing head. A common type of reservoir may consist of a container, such as a cartridge, containing building material. Other types of reservoirs and feed systems may be used.

The printing of a given three-dimensional object may require a finite and calculable amount of building material for completion. It may be advantageous to have a system for efficiently managing the supply of materials for usage during a printing process.

SUMMARY

Embodiments of the present invention provide an apparatus and method for management and control of the supply of building materials in three-dimensional object-printing apparatuses. A printing system, according to some embodiments of the present invention, may include a controller, a printing apparatus, and a cartridge, container or supply system that may include a sensor to measure the status of building material in the cartridge. In other embodiments the 3D printing apparatus may include a system such as a set of valves or a valve matrix to control supply of building materials from at least one cartridge apparatus or supply system to the printing apparatus.

According to some embodiments of the present invention, management and control of materials may be achieved by measuring data on the status of building material in at least one printing cartridge or supply system, and processing the building material status data to determine parameters of the building material. The printing controller may further determine supply parameters of the building material, and control the supply of the building material from two or more cartridges according to the supply parameters. In some embodiments, the printing controller may send messages to an operator.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein.

Figure 1:
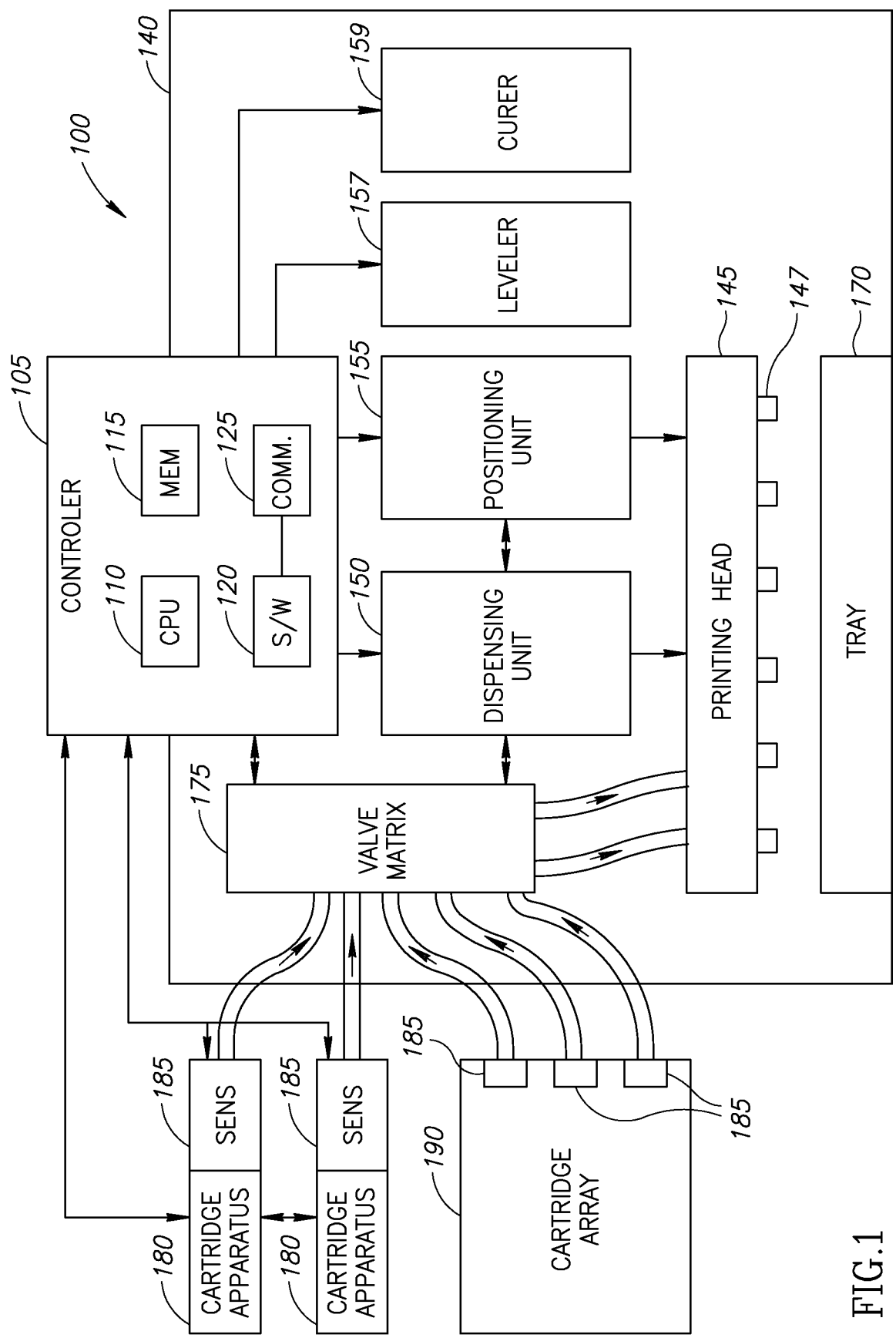
FIG. 1 is a block diagram of a 3D printer system according to an exemplary embodiment of the present invention.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

It is noted that the term "building material" as used herein may include model or "modeling" material, support material, and/or any suitable combination of model material and/or support material, used in the building, forming, modeling, printing or other construction of three-dimensional (3D) objects or models. Building material may include material used to create models, material used to modify such material (e.g., dyes, fillers, etc.), support material, or other material used in the creation of objects, whether or not appearing in the final object.

In some 3D printing systems completion of a 3D object may take, for example, a number of hours, during which time the building material from one or more supply sources (e.g., cartridges, reservoirs, bags, etc.) may run dry or be depleted. According to some embodiments of the present invention, the building material sources required for object printing, for example one or more three dimensional building material storage containers such as printer cartridges or other suitable sources, may be monitored and, for example, the supply of materials may be controlled so as to provide building materials on demand. In addition, the supply of building materials of multiple colors or types required for the printing of a given object may be monitored and selectively controlled. Embodiments of the present invention may provide apparatuses and methods for management and control of the supply of material or materials required for the printing of three-dimensional prototype objects, such as models, in three-dimensional printing systems. In some embodiments, such control apparatuses and methods may help to ensure continuous and uninterrupted supply of required material(s) to a 3D printing apparatus, and may negate the necessity for manual monitoring of materials and on-hand replacement of containers during printing.

The printing system and system components according to embodiments of the present invention may be similar to and use or be based on aspects of embodiments described in U.S. Pat. No. 6,259,962, issued Jul. 10, 2001, titled "APPARATUS AND METHOD FOR THREE DIMENSIONAL MODEL PRINTING"; U.S. Pat. No. 6,569,373, issued May 27, 2003, titled "COMPOSITIONS AND METHODS FOR USE IN THREE DIMENSIONAL MODEL PRINTING"; U.S. Pat. No. 6,658,314, issued Dec. 2, 2003, titled "SYSTEM AND METHOD FOR THREE DIMENSIONAL MODEL PRINTING"; and U.S. Pat. No. 6,850,334, issued Feb. 1, 2005, titled "SYSTEM AND METHOD FOR THREE DIMENSIONAL MODEL PRINTING", as well as U.S. patent application Ser. No. 10/424,732, filed Apr. 29, 2003, titled "COMPOSITIONS AND METHODS FOR USE IN THREE DIMENSIONAL MODEL PRINTING", published as US patent application publication No. 2003-0207959, now abandoned; Ser. No. 10/101,089, filed Mar. 20, 2002, titled "SYSTEM AND METHOD FOR PRINTING AND SUPPORTING THREE DIMENSIONAL OBJECTS", published as US patent application publication No. 2002-0171177, now abandoned; and/or Ser. No. 10/336,032, filed Jan. 3, 2003, titled "DEVICE, SYSTEM AND METHOD FOR ACCURATE PRINTING OF THREE DIMENSIONAL OBJECTS", published as US patent application publication No. 2003-0151167, now abandoned; all assigned to the common assignee of the present invention and fully incorporated herein by reference. However, the printer system according to some embodiments of the present invention may also have other configurations and/or other methods of operation. For example, the printer system according to the present invention may include more than one printing head, and/or more than one material dispenser, positioner, curer, imager, illuminator, leveler, sensor, cartridge, cartridge valve, etc. In further embodiments, layer-by-layer deposition need not be used, and other curing or solidifying methods may be used.

FIG. 1 is a block diagram of a 3D printer system 100 according to an exemplary embodiment of the present invention. 3D printer system 100 may include, for example, a controller 105, printing apparatus 140, and one or more three dimensional modeling material supply sources such as cartridge apparatuses 180 or cartridge arrays 190. In a typical configuration, a set of cartridge apparatuses outside of cartridge arrays is not used with a separate cartridge array, but such a configuration is within the scope of the invention.

Controller 105 may include, for example, a processor 110, a memory unit 115, software code 120, and a communications unit 125. Other configurations may be used for a controller or control unit. Control functionality may be spread across units, and not all control functionality may be within system 100. For example, a separate unit, such as a personal computer or workstation, or a processing unit within a supply source such as a cartridge may provide some control or data storage capability. Communications unit 125 may, for example, enable transfer of data and instructions between controller 105 and printing apparatus 140, and/or between controller 105 and one or more cartridge apparatuses 180 or cartridge arrays 190.

Printing apparatus 140 may include for example a printing head 145, a material dispenser 150, a positioner 155, a printing tray 170, a set of valves (wherein set may include one item) such as a valve matrix 175, a leveler 157, and curer 159 and any other suitable components. Printing apparatus 140 may include other suitable combinations of components.

Material supply sources, such as cartridge apparatus 180, may be situated within printing apparatus 140 or external to printing apparatus 140, and may be situated in a separate unit connected to printing apparatus 140. One or more cartridge arrays 190 may be situated in one or more independent units, connectable to printing apparatus 140. One or more cartridge apparatuses 180 and/or cartridge arrays 190 may be connected to valve matrix 175 or other set of valves via, for example, tubes carrying building material. Cartridge apparatuses 180 and/or cartridge arrays 190 may include one or more sensors 185 for each cartridge, to determine the status of the modeling material in one or more cartridges. Cartridge apparatus 180 may provide, for example, model material and/or support material for use by printing apparatus 140, to print 3D objects. Suitable material supply units other than cartridges may be used; for example, storage tanks, internal refillable tanks, bags or other units without external casings, etc. One or more sensors 185 may be part of cartridge apparatus 180.

Controller 105 may utilize Computer Object Data (COD) representing an object or a model, such as CAD data in Stereo Lithography (STL) format. Other data types or formats may be used. Controller 105 may convert such data to instructions for the various units within 3D printer system 100 to print a 3D object. Controller 105 may be located inside printing apparatus 140 or outside of printing apparatus 100. Controller 105 may be located outside of printing system 100 and may communicate with printing system 100, for example, over a wire and/or using wireless communications. In some embodiments, controller 105 may include a CAD system. In alternate embodiments, controller 105 may be partially external to 3D printer system 100. For example, an external control or processing unit (e.g., a personal computer, workstation, computing platform, or other processing device) may provide some or all of the printing system control capability.

In some embodiments, a printing file or other collection of print data may be prepared and/or provided and/or programmed, for example, by a computing platform connected to 3D printer system 100. The printing file may be used to determine, for example, the order and configuration of deposition of building material via, for example, movement of and activation and/or non-activation of one or more nozzles 147 of printing head 145, according to the 3D object to be built.

Controller 105 may be implemented using any suitable combination of hardware and/or software. In some embodiments, controller 105 may include, for example, a processor 110, a memory 115, and software or operating instructions 120. Processor 110 may include conventional devices, such as a Central Processing Unit (CPU), a microprocessor, a "computer on a chip", a micro controller, etc. Memory 115 may include conventional devices such as Random Access Memory (RAM), Read-Only Memory (ROM), or other storage devices, and may include mass storage, such as a CD-ROM or a hard disk. Controller 105 may be included within, or may include, a computing device such as a personal computer, a desktop computer, a mobile computer, a laptop computer, a server computer, or workstation (and thus part or all of the functionality of controller 105 may be external to 3D printer system 100). Controller 105 may be of other configurations, and may include other suitable components.

Controller 105 may receive data from one or more material supply sources, and control the supply of building material to printing apparatus 140, for example, by controlling the extraction or flow of materials from the printing material sources, such as printing cartridges. For example, controller 105 may use software code 120 to process data related to the status of building material in one or more supply sources to compute material parameters for building material(s), material required to construct one or more objects, and supply parameters for materials in one or more cartridges. For example, material status data may indicate types, volumes, masses, or other measures, quality, status etc. of building material in one or more supply sources. For example, material parameters may indicate potential yields during printing usage etc. For example, computations of material required may indicate how much material from one or more material supply sources may be used in constructing one or more objects. For example, supply parameters may indicate or help determine, by controller 105 and/or one or more operators, whether or not to use building material from at least one selected cartridge or other source (e.g., to prevent the need for a source switch during an object build), when to extract building material from one or more cartridges, and how much building material to extract from one or more cartridges at any given time, according to the requirements of printing apparatus 140 for a particular object being printed. Controller 105 may be suitably coupled and/or connected to various components of printing apparatus 140, to one or more cartridge apparatuses 180, and to one or more cartridge arrays 190. For example, controller 105 may control valves, pumps, switches, compression or inflation devices, positioning units, dispensing units, leveling devices, curing devices, or any other system components.

Figure 2:
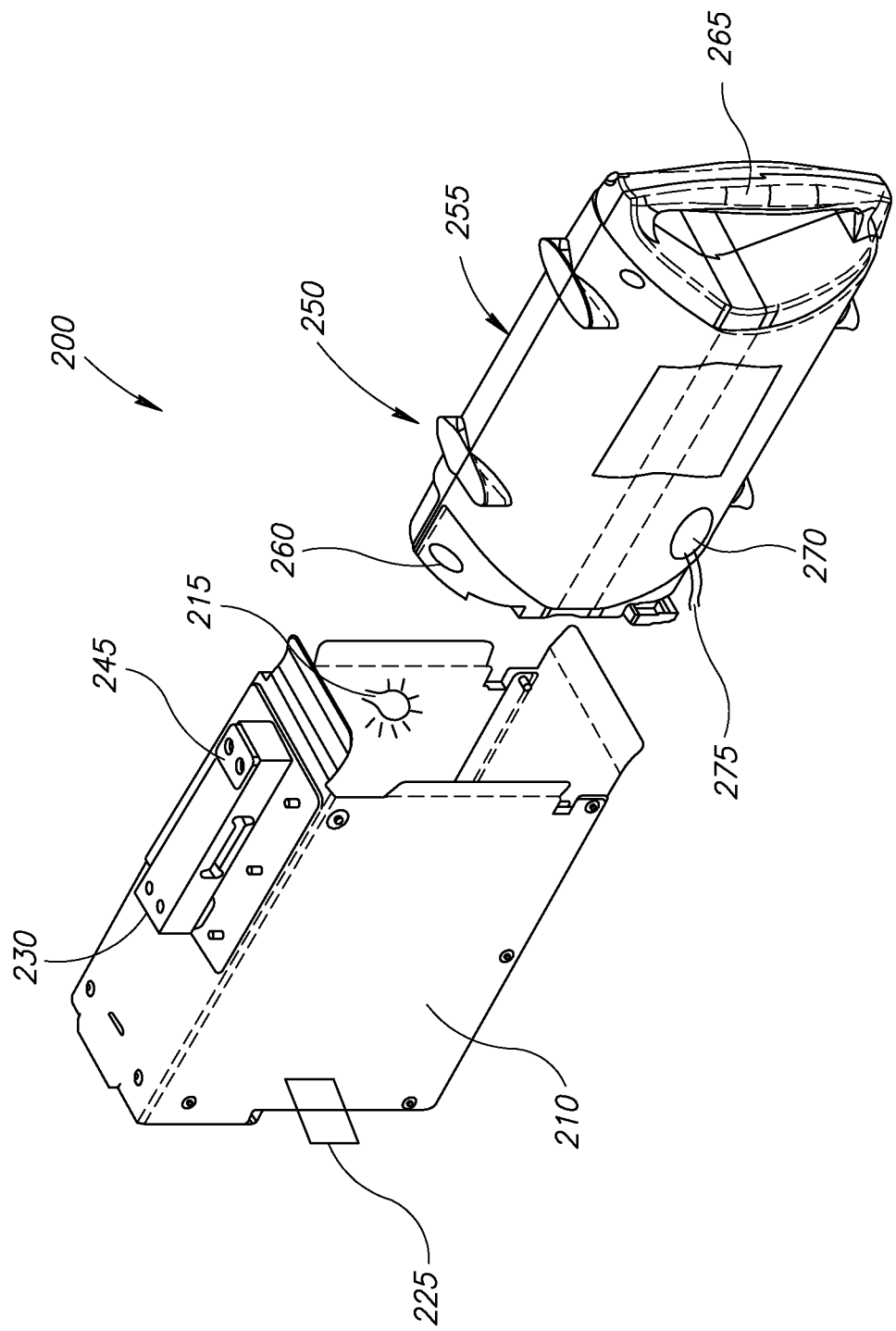
FIG. 2 is a schematic illustration of a cartridge apparatus according to an exemplary embodiment of the present invention.

Reference is now made to FIG. 2, which is a schematic illustration of an exemplary material supply source, such as, for example, cartridge apparatus 200 according to some embodiments of the present invention. Cartridge apparatus 200, which may be integrated into printing system 100, may include a cartridge housing or holder 210, to house a typically disposable cartridge 250, which may store building material required by printing apparatus 140. Cartridges or supply units need not be disposable. Building material may include any suitable kind of object building material, such as, for example, photopolymers, wax, powders, plastics, metals, and may comprise model material or support material or any combination of model and support material, or other suitable 3D object printing materials. Building material may be inserted within cartridge 250 and/or removed from cartridge 250. In other embodiments a cartridge apparatus may be an apparatus to hold, store or interface with supply units other than cartridges. Cartridge housings or receiving units of other forms may be used.

In some embodiments of the present invention, the model and support materials used for construction of the 3D object are in a liquid form. Such materials may be similar to those described in embodiments of U.S. Pat. Nos. 6,569,373 and 6,658,314 and US Patent Publication Application Number 2003/0207959, all of the same Assignee, and incorporated herein by reference. In an exemplary embodiment of the present invention, the model and/or support materials used are photopolymers that may contain material curable by electro-magnetic radiation and/or electron beams etc. The materials may come in different forms, textures, colors, etc. Other materials may be used.

Cartridge holder or housing 210 may be constructed to house cartridge 250. Cartridge 250 may include a handle 265 on one end for easy manual handling, and one or more apertures (not shown) on one or more sides, through which tubes or other components may extrude or be inserted. Cartridge housing 210 may include an interface unit or memory device reader, such as a memory chip reader 225 that may be connected to printing controller 105, to read data from one or more memory devices such as memory chips or other data storage units associated with cartridge 250, and transfer data to controller 105. Other suitable data interface units or data storage units may be used. For example, chips need not be used. Cartridge housing 210 may include a connection unit, for example, load cell 230, which may, for example, include one or more sensors (e.g., sensor 185) to gauge mechanical load properties. Load cell 230 may, for example, secure cartridge housing 210 to printing system 100, translate mechanical load of cartridge 250 to voltage, transmit signals to controller 105 and/or execute other suitable functions. Controller 105 may, for example, translate a signal sent from load cell 230 into weight (mass) status data or other suitable data, thus, for example, helping to determine the status of building material within a cartridge at any given time. One or more sensors, for example, weight sensors, may be located within load cell 230, however sensors need not be located in load cell 230. Other suitable sensors, such as volume sensors, may be used.

Cartridge housing 210 may be connected to the printing apparatus 140 via, for example, a connection mechanism 245, or any other suitable connection mechanism. Cartridge housing 210 may include a cartridge-sensing unit (e.g., 550 in FIG. 5), which for example may sense whether or not a cartridge 250 is in place within cartridge housing 210, and may transmit this data to controller 105. Sensors (e.g., sensors 185 in FIG. 1), which may be located within load cell 230, may continually or periodically gauge the status of material within cartridge 250 or of cartridge 250. Sensors 185 may gauge the mass of cartridge 250 or of a portion of cartridge 250 thereby indicating the mass of building material within cartridge 250. Data from sensors 185 may be transferred to processor 110, optionally by load cell 230. Load cell 230 may be situated anywhere on cartridge housing 210, for example, on top of cartridge housing 210, beneath housing 210, or on any other part of the housing, to enable gauging and/or translating of mechanical load characteristics of a cartridge 250 housed in cartridge holder 210 into electrical signals, for example, for transmission to controller 105. Cartridge holder 210 may be transparent, opaque, or impervious to light. Load cell 230 may be connected to controller 105 by for example a cable connection or any other suitable connection. Other suitable devices and methods for gathering data about materials may be used.

Figure 3:
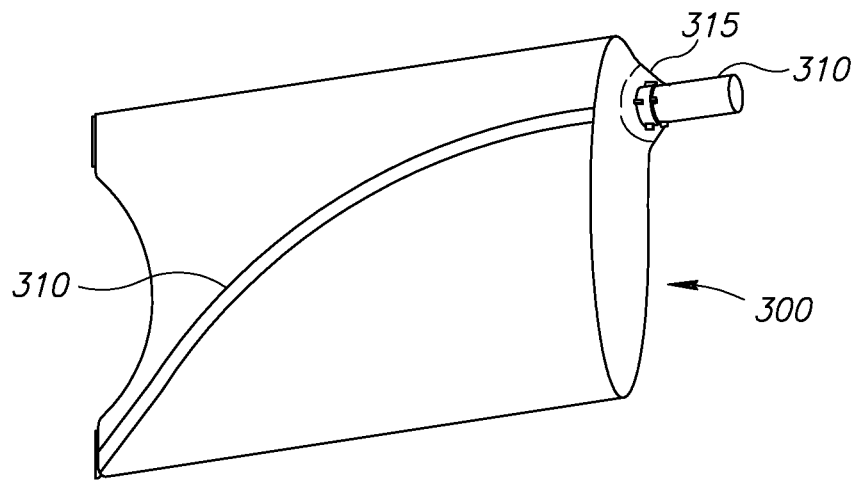
FIG. 3 is a graphical illustration of a cartridge inner bag according to an exemplary embodiment of the present invention.

Cartridge 250 may be, for example, flexible, disposable, and replaceable. Reusable supply sources may also be used. Cartridge 250 may have, for example, an external rigid and/or inflexible casing or shell 255, and an internal material holder such as a bag. External casing need not be inflexible, and other numbers and combinations of shells or casing/holders may be used. An example of an internal bag of cartridge 250 can be seen with reference to FIG. 3, which is a graphical illustration of an inner cartridge bag 300 in an inflated state, which may contain building material, for example, model and/or support material, to be used by printing apparatus 140. Cartridge bag 300 may be constructed, for example, from flexible and typically impermeable material, such as flexible and impermeable metallic material or any other suitable flexible and impermeable material, and may be transparent, opaque or impenetrable to light. Internal bag 300 may include an inner tube 310, which may be, for example, a rubber-sealed protruding tube through which the building material may be drawn or channeled. Tube 310 may protrude outside of bag 300 for connection to tubing of printing apparatus 140. The protruding end of inner tube 310 may extend through an aperture/s (not shown) in external cartridge shell 255 of cartridge 250. For example, inner tube 310 may have a sloping shape that may be placed with one end extending from the lowest point of inner bag 300, and the other end protruding through another end 315 of bag 300. Other configurations for cartridges or material supply systems may be used. For example, cartridge units or material supply units need not use internal holders or bags. Tubes need not be included within storage devices.

When cartridge 250 is inserted into cartridge housing 210, tube 310 may be punctured by, for example, a needle or other piercing or cutting unit connected to cartridge housing 210, thereby enabling material flowing or being moved through tube 310 to flow or be moved through the tubing within printing apparatus 140, and enabling printing apparatus 140 to draw building material from cartridge 250 through the thus extended and connected tubing. In one embodiment, cartridge bag 300 may generally be square or oblong in shape, or may have a 'sloping' base that may enable building material to concentrate towards the lowest point of the 'sloping' bag, where inner tubing 310 may draw out the building material. Alternatively, cartridge shell 255 may contain the building material and internal tube 310, without requiring inner bag 300. In such a case, tube 310 may protrude outside of cartridge casing 255, for example, for connection to printing apparatus 140. Other suitable shapes and configurations may be used. Connection and transport units other than tubes may be used.

According to one embodiment, an aperture 270 may be located at a low point of cartridge shell 255 or inner bag 300. Air or other suitable fluid or gas, for example, air or other gas under pressure, may be introduced into cartridge 250 or inner bag 300 from printing apparatus 140, via the aperture, for example, by way of a tube 275, needle or other suitable device. The material within cartridge 250 or inner bag 300 may be squeezed out of cartridge 250 or inner bag 300 into the tubes leading into printing apparatus 140, due, for example, to the introduction of air pressure. Such air pressure may be controlled, for example, by valve matrix 175 or other set of valves in printing apparatus 140, as is described in detail below.

According to some embodiments a memory device such as a memory chip 260 or other suitable data storage device may be associated with cartridge 250. Memory chip 260 may, for example, store and/or record information relating to the material stored within cartridge 250, for example, the type of building material in the cartridge bag 300, the material's color, manufacturing date, optimal operation parameters (e.g., recommended jetting temperature), optimum building parameters (e.g., for building or support), and material parameters (e.g., viscosity and surface tension at the recommended temperature etc.) etc. Other suitable data may be stored. Building material information may include, for example, material density, material mass per volume, and other suitable data from which material status may be computed.

In some embodiments information relating to the material stored within cartridge 250 may be preprogrammed onto a memory chip, e.g., chip 260. Such information may include, for example, material mass per volume. During the course of printing such information may be continuously updated such that when cartridge 250 is emptied or is significantly depleted, cartridge memory chip 260 may be marked accordingly. For example, memory chip 260 may aid in prevention of re-use of a cartridge 250 by, for example, marking a cartridge casing 255 or another part of cartridge 250 as having been already used. For example, chip 260 may be marked by a "0" (zero) for zero mass, or a value relatively close to a predetermined minimum mass, and "1" (one) for a mass indicating a full or substantially full cartridge etc. In this way, for example, if the same cartridge casing 255 is replaced into one or more cartridge holders 210, the cartridge holder 210 will be recognized as having already been used. Chip 260 may additionally or alternatively be marked to indicate degrees of building material fullness or depletion, for example, by providing a grading from 1-10 or a percentage point etc., to indicate the level of building material in a cartridge. Chip 260 may be marked in any other way. Other suitable memory devices or data storage devices may be used. Other suitable data or coding systems may be used to mark the status of a material supply.

According to some embodiments, a memory chip reader 225 may be associated with cartridge housing 210, to read data stored in memory chip 260. A memory device reader such as memory chip reader 225 may be connected to controller 105, and may transfer data to controller 105, for example, using a cable connection. Controller 105 may use the data received, for example, data from memory chip reader 225, data from load cell 230, and other data, to compute printing parameters, including, for example, guidelines for which cartridges to use, how many to use, if and when any replacements are necessary etc., as is described in detail below.

In one embodiment, the printer system 100 or another component such as a material source, cartridge, cartridge holder, etc. may include the capability to cure, solidify, or otherwise render inert or useless remnant material within a material source. In one embodiment cartridge housing 210 may include at least one source of electromagnetic radiation 215, for example a bulb or other suitable device, which may generate wavelengths similar to those of curing apparatus 159. Electromagnetic radiation source may be activated by controller 105 or another suitable control units, or for example by user command, to cure remnant materials within a used cartridge, for example, for easy, disposal of remnant materials after use. For example, when placing a cartridge 250 in the cartridge housing 210, an electromagnetic bulb may be linked to a source of energy via, for example, cartridge housing 210. When cartridge 250 empties or is at a certain low level, for example, controller 105 may initiate activation of the electromagnetic source within cartridge 250, or the generated electromagnetic radiation may be channeled into cartridge 250. The material remaining in the disposable cartridge 250 may be cured within cartridge 250, and may then be more easily disposed of. The source of electromagnetic radiation may be situated in another location; for example within inner bag 300 of cartridge 250, and may be activated by, for example, electrical impulses or radio waves etc. Such an internally placed source of electromagnetic radiation may be connected to the exterior of bag 300, to the cartridge shell 255, or to the cartridge housing 210 by, for example, electrical wiring or radio frequency radiation from a source of energy, thereby inducing emission of said curing electromagnetic radiation. Examples of such sources of energy may include LED's, antennas, and any other suitable energy sources. In other embodiments, other curing or solidifying systems may be used, and other systems may be used allowing material within a supply unit to be rendered solid, inert, useless for use, and so on.

In one embodiment, the source of electromagnetic radiation may be internally placed, for example, within cartridge shell 255. In such a case, prior to activation of radiation, the bag or other container may be inflated with air or other gas or fluid pumped into it from, for example, printing system 100, in order to regain the initial open form of the bag or to otherwise increase the volume of the bag or container, thereby enabling the electromagnetic radiation to reach substantially all parts of inner bag 300.

In other embodiments, the source of electromagnetic radiation may be situated within external shell 255 of the disposable cartridge 250, and connected via an opening in the shell 255 to a source of energy in printing apparatus 140, via the cartridge housing 210. In such a case, for example, casing 255 may be made of material impervious to light and inner bag 300 may be made of transparent material, enabling curing of the remnant materials within the used cartridge. In other embodiments, other containers may be wholly or partially transparent, to enable curing or other solidification or rendering material useless or inert.

In further embodiments, the source of electromagnetic radiation or other curing energy may be situated within cartridge housing 210 and may penetrate the disposable casing 255 via, for example, an aperture. A hole may be created before the curing, solidifying or other transformation of the material is performed. The source of electromagnetic radiation may penetrate the disposable inner bag via, for example, a needle which may puncture inner bag 300 and thus enable penetration of the source of the electromagnetic light into bag 300.

Figure 4:
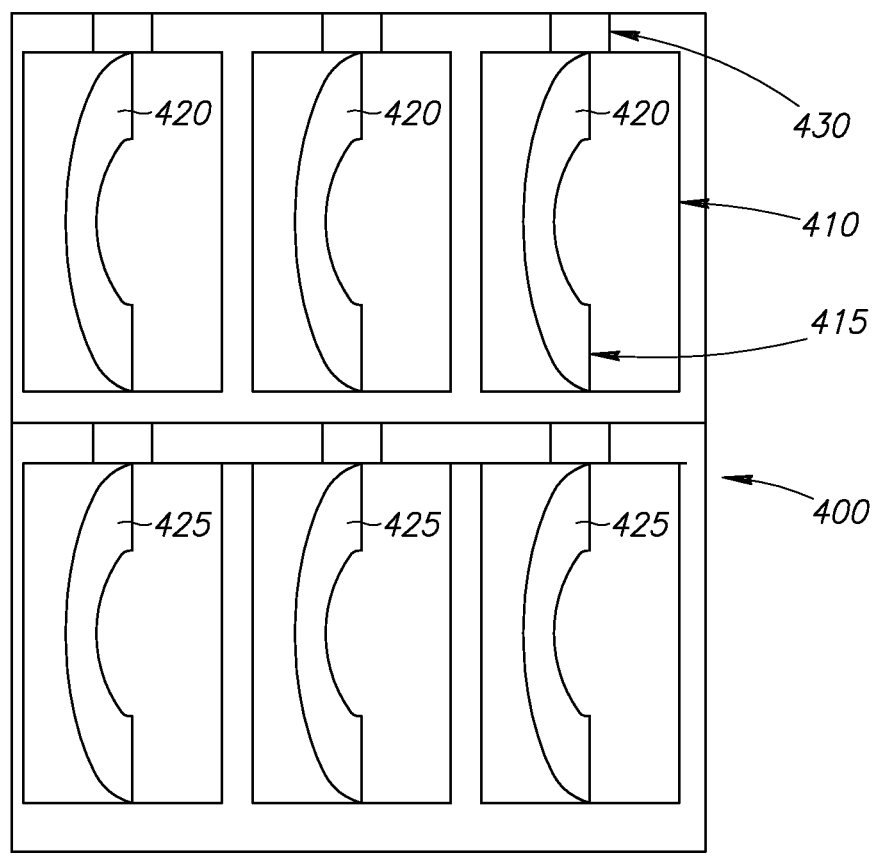
FIG. 4 is a schematic illustration of an array of cartridges according to an exemplary embodiment of the present invention.

Reference is now made to FIG. 4, which is a schematic illustration of an array 400 of cartridges 410, each of which may contain building material, according to an exemplary embodiment of the present invention. A plurality of cartridges 410 may be located within array 400. Array 400 may be located within printing apparatus 140, or externally to printing apparatus 140, for example in a separate unit. Cartridges 410 may be any suitable material supply or storage system, and may include a cartridge bag 415, which may contain, for example, building material 420 and/or support material 425. Other types of materials may be contained, and other numbers of materials (e.g., one). Building material may be stored in, for example, a liquid form, and may have different forms, colors, compositions etc. Each type and/or color or suitable combination etc. of building material may be contained separately within one or more cartridges. Each cartridge 410 may be connected separately and individually to printing apparatus 140 via, for example, a valve matrix 175 or other suitable set of valves or switching devices. In the case where matrix 400 has cartridges having identical material, cartridges 410 may be jointly connected to printing apparatus 140. Any number or ratio of modeling material and/or support material-containing cartridges 410 may be inserted into or removed from array 400, according the requirements of one or more 3D objects to be printed. Switching or valving systems, or sets of valves, other than a valve matrix, may be used.

Each cartridge 410 may be connected to, for example, a sensor 430, for example, a weight sensor, to measure or otherwise determine the status of building material 415 in the cartridge, for example, the mass of the material within a cartridge bag. Sensor 430 may be connected to controller 105, and may transmit recorded data to controller 105. Each cartridge 410 may be associated with a memory or storage device such as a memory chip 260 and reader or data transfer device such as a memory chip reader 225, as described in detail herein. Controller 105 may select which cartridges 410 to use for object printing based on, for example, data received from sensor(s) 430, memory chip reader(s) 225, cartridge sensor 550, and any other suitable sensor elements. For example, cartridge 250 availability, weight, material types, material color, or any other parameters may be factored into such a selection. For example, during printing, controller 105 may first select a cartridge with the lowest measured weight. Once the cartridge is emptied or is at a certain low level, controller 105 may, for example, shut off a valve connected to the tube from the emptied cartridge, and open a valve for an available cartridge 250 containing the same type of material. Other methods of stopping material flow may be used.

In one embodiment, when construction of any given three-dimensional object may continue, for example, over a period of many hours, printing system 100 may provide a substantially continuous and uninterrupted flow of building materials to one or more printing heads 145, by continuously drawing materials from selected cartridges 410 using automated switching of material supply sources, enabled by computer-controlled valve selection. For example, when one material source, such as a cartridge, is depleted or reaches a pre-determined low amount of material, the system may switch to the use of a different material source. Such switching may be automated, not requiring user intervention. Such switching may be the result of a request or alert to a user.

Figure 5:
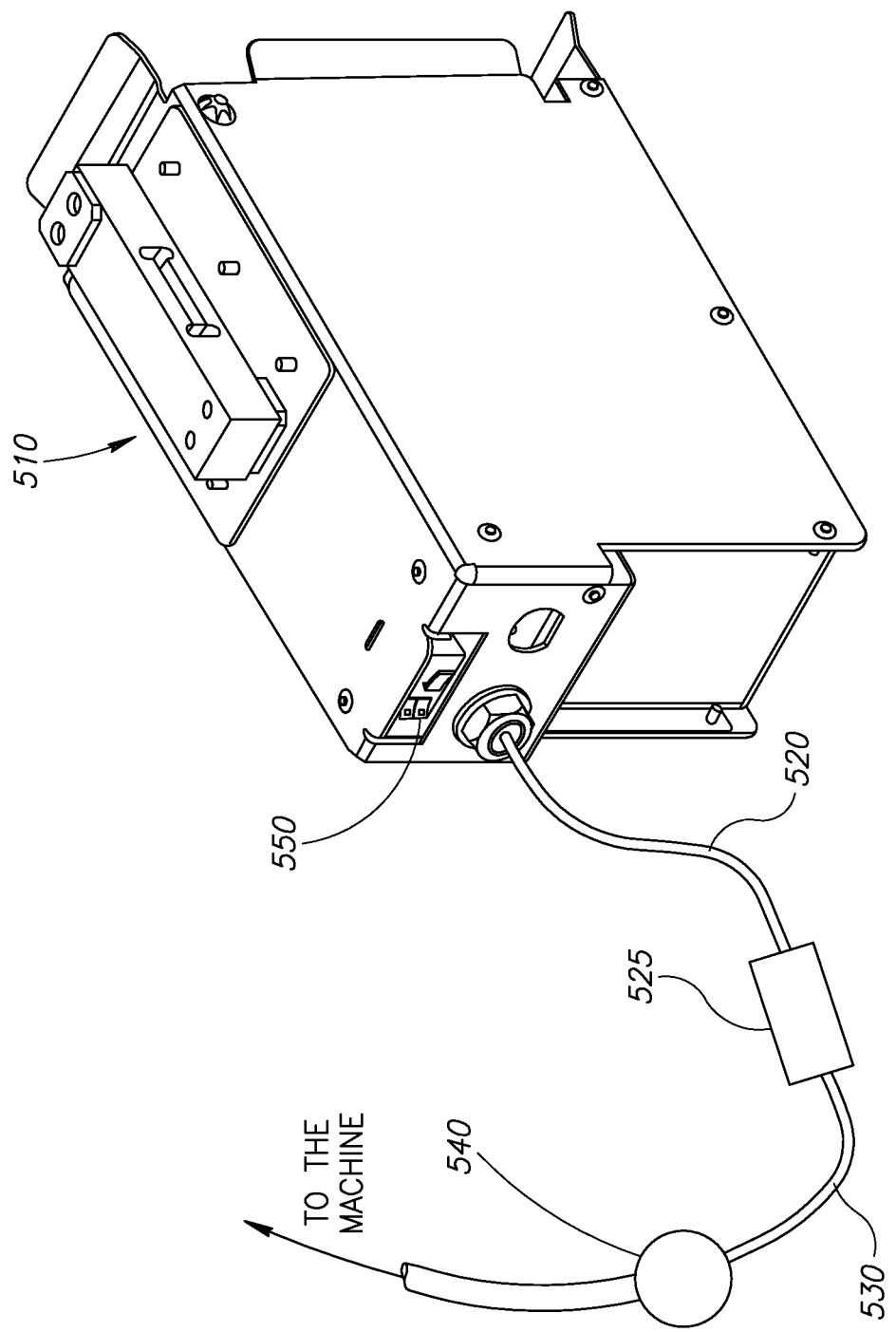
FIG. 5 is a schematic illustration of a cartridge housing and associated components according to an exemplary embodiment of the present invention.

Reference is now made to FIG. 5, which is a schematic illustration of the back of cartridge housing 510 with associated components. One or more transfer units such as tubes 520 may emanate from cartridge 250, and may protrude through cartridge housing 510, through which building material may flow to printing apparatus 140. Each tube 520 may include, for example, a valve 525, which may be situated in valve matrix 175, by which the flow of material through respective internal tubes 530, into printing head 145 may be controlled. Valve matrix 175 may enable routing of respective incoming tube(s) 520, and enable selective control over the usage of available building materials from the respective cartridges 250. For example, valves in valve matrix 175 may have open and closed states. The state of each separate valve may be either open or closed as determined by the controller. Controller 105 may, for example, toggle valves from open to closed or closed to open, as relevant. Other valve states may be used. Internal tubes 530 may lead to one or more pumps 540, to pump or draw building material into printing apparatus 140, as required according to printing controller 105 instructions. Pump 540 may be, for example, a peristaltic pump, but other types of liquid pumps may be used. For example, when one or more cartridges such as 250 of FIG. 2 are inserted into one or more respective cartridge holders 510, tubes 520 may connect to one or more respective internal tubes 530 of printer apparatus 140, via valve matrix 175. In one embodiment, at least two tubes may emanate from valve matrix 175 and may be routed to printing head 145, at least one tube bearing modeling material or materials, and at least one other tube bearing support material or materials. Controller 105 may toggle opening or closing of specific valves 525, and thus determine from which cartridge 250 material may be drawn into the modeling material tube(s) and/or the support material tube(s) respectively. Other tube types or number of tubes may be utilized.

According to some embodiments of the present invention, a method is provided to monitor and calculate the amount of building material required for printing a particular object or series of objects. In other embodiments, a method is provided for providing required building material to printing apparatus 140, according to the object or objects being printed. Still other embodiments provide a method for alerting a system operator when, for example, additional building materials are required.

Figure 6:
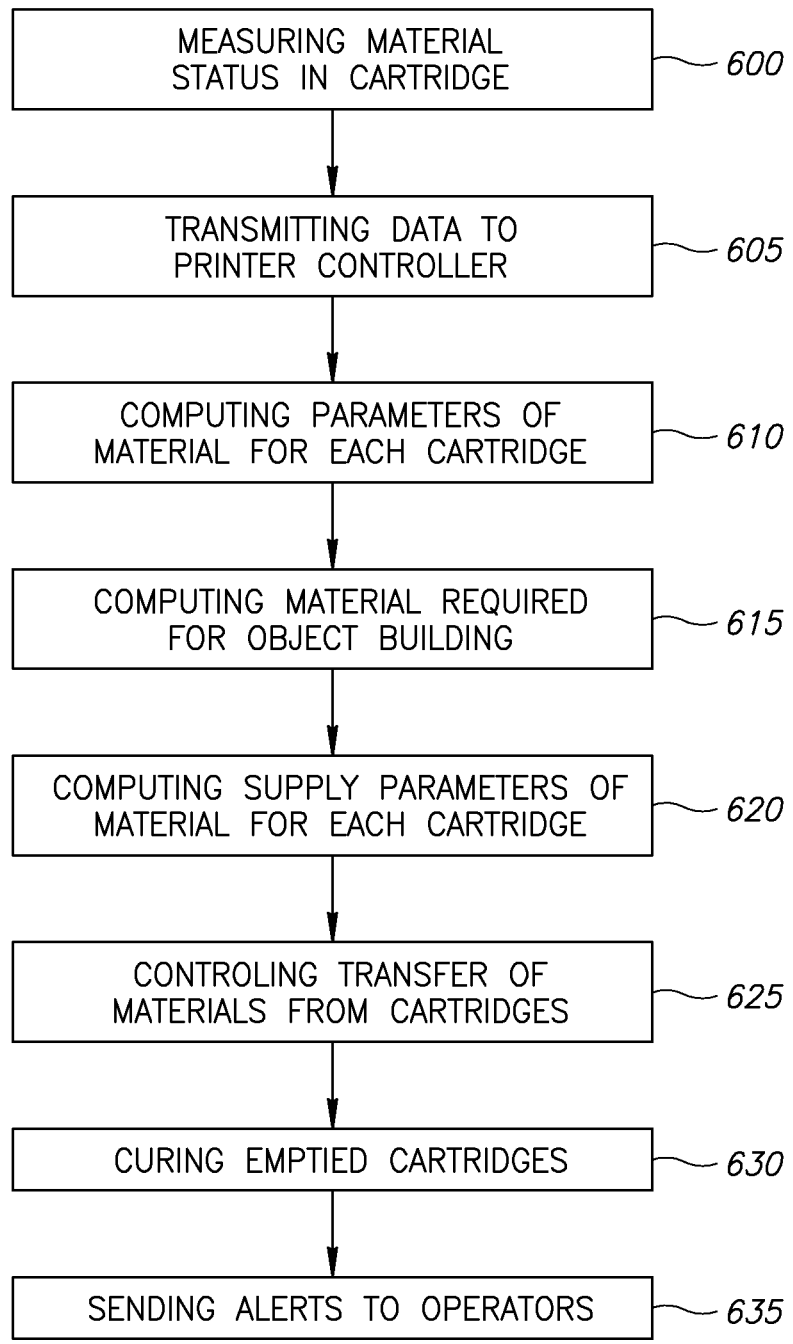
FIG. 6 is a flow chart illustration of an exemplary method to control material supply to a 3D printing apparatus according to an embodiment of the present invention.

FIG. 6 is a flow chart diagram of a method to monitor, compute, and control building material supply in a 3D printing system, according to some embodiments of the present invention. The method of FIG. 6 may be used, for example, with 3D printer system 100 of FIG. 1 and/or with other suitable 3D printers. As indicated at block 600, the status of the building material in one or more cartridges may be measured by respective sensors, for example, weighing or other sensors associated with the individual cartridges. Supply units other than cartridges may be used. At block 605 this data, as well as other data, for example, from a memory chip associated with a cartridge, may be transmitted to a printer controller. At block 610 various parameters of the materials within the various cartridges may be computed by the controller, for example, the amount of material of each type and/or color presently available in each cartridge, by, for example, utilizing the data provided by the respective sensors and respective memory chips attached to the respective cartridges. For example, the memory devices or chips may store data relating to the material type, properties, etc. The sensor may weigh the material in the cartridge. The controller may calculate the quantity of material in the cartridge by, for example, subtracting the current weight of the cartridge from the known weight of a full cartridge. The controller may also detect the presence of one or more empty cartridges. The controller may utilize data relating to the object to be printed, such as print data, CAD data, control data, etc.

At block 615 the printer controller may compute, for example, the amount of modeling material, support liquid, or combination of modeling and support materials required for printing a given three-dimensional object. The printer controller may also compute the expected order and quantity of uptake and deposition of each type of material into the printing apparatus, for the printing or construction of a given object.

At block 620 the printer controller may compute, based on the materials required for printing a given object, supply parameters for the material in each cartridge. For example, the controller may determine whether the amount of modeling and/or support material in the available cartridges is sufficient to complete a three-dimensional object to be built or printed, and the order of usage of the available cartridges to meet these needs. The controller may also determine, for example, based on expected usage of material and actual availability of materials, for example, the length of time remaining until one or more cartridges may be expected to empty, and should therefore be replaced. The relevant information may be displayed on, for example, a computer screen.

During the printing process the controller may continue to monitor, for example, the status of the building material(s) remaining in one or more respective cartridge bags, the total amount of building material of each type still required to complete the construction of one or more three-dimensional objects, and the length of time remaining before each respective cartridge may need to be replaced by another cartridge in line etc.

At block 625 the printer controller may control the transfer of materials from the various cartridges to the printing apparatus. For example, the controller may provide instructions to close a valve of an empty cartridge, or a cartridge or source where, for example, there is not enough material to continue to extract, via for example the valve matrix system, and transfer the uptake or extraction of required modeling material to one or more additional cartridges that contain relevant building materials, by opening one or more relevant valves. These additional cartridges may be arranged, for example, in a line or in an array etc. to be used as reserve material sources for use by the printing apparatus. Suitable methods of switching material source other than valving may be used.

According to an embodiment of the present invention, at block 630 the printer controller may, for example, initiate curing, solidifying, the making useless of, etc., of remnant material within one or more used cartridges, as described in detail herein.

According to some embodiments, at block 635, if controller 105 determines that the amount and/or type of material in one or more cartridges 250 requires replacement, controller 105 may, for example, transmit an alert message to one or more system operators. Such an alert message may be, for example, in the form of an email message and/or an SMS message to one or more computing or communication devices. Such messages may include content or details noting, for example, the amount and/or type of material left in one or more cartridges, the length of time left until one or more cartridges may empty, and/or an estimated time at or by which one or more cartridges should be replaced. Controller may also send reminder messages or messages with alternative content relating to a printing process, for example using email, SMS etc., to one or more operators. For example, such messages may describe the estimated time for total job (printing job) completion, internal reference numbers, or other relevant information about the printing job or jobs. Other methods of transmitting messages may be used. Communication of messages may be, for example, via an external interface. For example, controller may be connectable to a computer and/or communications network, and may communicate messages or other data to an operator or alternative target via an email account or server, a cellular operator, a Web server, or any other suitable communication mediums.

Any combination of the above steps may be implemented. Further, other steps or series of steps may be used. For example, in one embodiment the curing of unused material in a supply container may be performed without other operations disclosed, such as without calculating remaining material, etc. Alerts may be sent without other operations or computing steps disclosed. Other embodiments or combinations may be used.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A cartridge array for a three-dimensional (3D) printing apparatus, the cartridge array comprising a plurality of cartridges, each cartridge of the plurality of cartridges being configured to contain one of a modeling material and a support material, wherein
each cartridge of the plurality of cartridges is connected to a sensor, said sensor configured to measure the status of the modeling material or support material contained in the respective cartridge, wherein
said sensor transmits data from the respective cartridge to said controller of the 3D printing apparatus, wherein
the data transmitted to said controller of the 3D printing apparatus comprises any one or more of availability of the respective cartridge, weight of the respective cartridge, material type contained in the respective cartridge and material color contained in the respective cartridge, and
wherein said controller is configured to shut off a valve or tube from a cartridge containing a type and/or color of material and open a valve for an available cartridge containing a different type and/or color of material.

2. The cartridge array of claim 1, wherein the plurality of cartridges is configured to contain more than one modeling and/or support material.

3. The cartridge array of claim 2, wherein the more than one modeling material comprises modeling materials having different types, forms, colors and/or compositions.

4. The cartridge array of claim 1, wherein each cartridge of the plurality of cartridges is configured to be separately and individually connected to the 3D printing apparatus.

5. The cartridge array of claim 1, wherein two or more cartridges of the plurality of cartridges are configured to be jointly connected to the 3D printing apparatus.

6. The cartridge array of claim 1, wherein two or more cartridges of the plurality of cartridges are configured to contain the same material.

7. The cartridge array of claim 1, wherein each cartridge of the plurality of cartridges is connected to the 3D printing apparatus via any one or more of a valve matrix, a set of valves, a valving system, a switching system or a set of switching devices.

8. The cartridge array of claim 1, wherein the sensor is a weight sensor configured to measure a mass of the material contained in the respective cartridge.

9. The cartridge array of claim 1, wherein each cartridge of the plurality of cartridges is configured to be associated with at least one of a memory, a memory chip, a reader, a memory chip reader, a data transfer device and a storage device of the 3D printing apparatus.

10. The cartridge array of claim 1, wherein said sensor is connected to a controller of the 3D printing apparatus.

11. The cartridge array of claim 1, wherein said controller is configured to select which cartridge of said plurality of cartridges to use for printing, based on the data transmitted.

12. The cartridge array of claim 1, wherein said controller is configured to select a cartridge of said plurality of cartridges with the lowest weight.

13. The cartridge array of claim 1, wherein said controller is configured to shut off a valve connected to a cartridge having a pre-determined low amount of material and open a valve connected to an available cartridge containing the same type of material.

14. The cartridge array of claim 1, wherein each cartridge of the plurality of cartridges is removably insertable into the array.

15. The cartridge array of claim 1, configured to be located within the 3D printing apparatus.

16. The cartridge array of claim 1, configured to be located externally to the 3D printing apparatus.

* * * * *